United States Patent
Park et al.

(10) Patent No.: US 8,682,921 B2
(45) Date of Patent: *Mar. 25, 2014

(54) QUERY ENGINE FOR BUILDING MANAGEMENT SYSTEMS

(75) Inventors: Youngchoon Park, Brookfield, WI (US); David S. Eidson, Franklin, WI (US)

(73) Assignee: Johnson Controls Technology Company, Holland, MI (US)

( * ) Notice: Subject to any disclaimer, the term of this patent is extended or adjusted under 35 U.S.C. 154(b) by 154 days.

This patent is subject to a terminal disclaimer.

(21) Appl. No.: 12/831,866

(22) Filed: Jul. 7, 2010

(65) Prior Publication Data

US 2012/0011141 A1    Jan. 12, 2012

(51) Int. Cl.
*G06F 17/30* (2006.01)

(52) U.S. Cl.
USPC .................. 707/769; 707/741; 707/810

(58) Field of Classification Search
USPC ............. 707/532, 1, 741, 32, 15; 706/47
See application file for complete search history.

(56) References Cited

U.S. PATENT DOCUMENTS

| | | | |
|---|---|---|---|
| 4,872,397 A | 10/1989 | Demeter et al. | |
| 5,061,916 A | 10/1991 | French et al. | |
| 5,117,900 A | 6/1992 | Cox | |
| 6,157,943 A | 12/2000 | Meyer | |
| 6,167,316 A | 12/2000 | Gloudeman et al. | |
| 6,332,163 B1 | 12/2001 | Bowman-Amuah | |
| 6,366,832 B2 | 4/2002 | Lomonaco et al. | |
| 6,405,103 B1 | 6/2002 | Ryan et al. | |
| 6,487,457 B1 | 11/2002 | Hull et al. | |
| 6,687,698 B1 | 2/2004 | Nixon et al. | |
| 6,772,216 B1 | 8/2004 | Ankireddipally et al. | |
| 6,788,980 B1 | 9/2004 | Johnson | |
| 6,839,601 B1 | 1/2005 | Yazback et al. | |
| 6,842,776 B1 | 1/2005 | Poisner | |
| 6,845,396 B1 | 1/2005 | Kanojia et al. | |
| 6,862,589 B2 | 3/2005 | Grant | |
| 6,895,513 B1 | 5/2005 | Balasubramaniam et al. | |
| 7,000,238 B2 | 2/2006 | Nadler et al. | |
| 7,017,162 B2 | 3/2006 | Smith et al. | |
| 7,039,591 B2 | 5/2006 | Ecklund et al. | |
| 7,039,654 B1 * | 5/2006 | Eder ..................................... 1/1 |
| 7,117,504 B2 | 10/2006 | Smith et al. | |
| 7,151,966 B1 | 12/2006 | Baier et al. | |
| 7,152,090 B2 | 12/2006 | Amirisetty et al. | |

(Continued)

FOREIGN PATENT DOCUMENTS

WO    WO 02/21259    3/2002

OTHER PUBLICATIONS

OPC™ Foundation, "OPC XML-DA Specification," Version 1.0, Jul. 12, 2003, 100 pages.

*Primary Examiner* — James Trujillo
*Assistant Examiner* — Thong Vu
(74) *Attorney, Agent, or Firm* — Foley & Lardner LLP

(57) ABSTRACT

A computer-implemented system for facilitating cross-subsystem queries of a plurality of building automation subsystems includes a first database storing a logical model for a building automation system. The system further includes a second database storing information for the plurality of building automation subsystems. The second database relates information for the plurality of building automation subsystems based on the logical model of the first database. The system also includes a query engine configured to decompose a cross-subsystem query received from an application into a plurality of subsystem queries using the information of the second database.

14 Claims, 10 Drawing Sheets

(56) References Cited

U.S. PATENT DOCUMENTS

| | | |
|---|---|---|
| 7,159,007 B2 | 1/2007 | Stawikowski |
| 7,162,534 B2 | 1/2007 | Schleiss et al. |
| 7,165,087 B1 | 1/2007 | Graupner et al. |
| 7,219,154 B2 | 5/2007 | Blakley, III et al. |
| 7,254,607 B2 | 8/2007 | Hubbard et al. |
| 7,266,600 B2 | 9/2007 | Fletcher et al. |
| 7,293,010 B2 | 11/2007 | Angele et al. |
| 7,295,984 B2 | 11/2007 | Glynn |
| 7,330,473 B1 | 2/2008 | Baier et al. |
| 7,340,714 B2 | 3/2008 | Upton |
| 7,343,428 B2 | 3/2008 | Fletcher et al. |
| 7,350,184 B2 | 3/2008 | Upton |
| 7,356,694 B2 | 4/2008 | Mayo et al. |
| 7,373,410 B2 | 5/2008 | Monza et al. |
| 7,376,959 B2 | 5/2008 | Warshavsky et al. |
| 7,392,391 B2 | 6/2008 | Eibach et al. |
| 7,398,307 B2 | 7/2008 | Dorland |
| 7,406,982 B2 | 8/2008 | Pfaff et al. |
| 7,461,039 B1 | 12/2008 | Gilman |
| 7,634,555 B1 | 12/2009 | Wainscott, Jr. et al. |
| 2002/0023091 A1 | 2/2002 | Silberberg et al. |
| 2002/0059425 A1 | 5/2002 | Belfiore et al. |
| 2002/0065857 A1* | 5/2002 | Michalewicz et al. ........ 707/532 |
| 2002/0174178 A1 | 11/2002 | Stawikowski |
| 2003/0004912 A1* | 1/2003 | Pant et al. ...................... 706/47 |
| 2003/0023712 A1 | 1/2003 | Zhao et al. |
| 2003/0028577 A1 | 2/2003 | Dorland et al. |
| 2003/0033376 A1 | 2/2003 | Brownhill et al. |
| 2003/0101170 A1 | 5/2003 | Edelstein et al. |
| 2003/0120665 A1 | 6/2003 | Fox et al. |
| 2003/0163450 A1 | 8/2003 | Borenstein et al. |
| 2003/0163597 A1 | 8/2003 | Hellman et al. |
| 2003/0177481 A1 | 9/2003 | Amaru et al. |
| 2003/0179228 A1 | 9/2003 | Schreiber et al. |
| 2004/0030739 A1 | 2/2004 | Yousefi'zadeh |
| 2004/0081183 A1 | 4/2004 | Monza et al. |
| 2004/0093331 A1 | 5/2004 | Garner et al. |
| 2004/0093344 A1 | 5/2004 | Berger et al. |
| 2004/0093559 A1 | 5/2004 | Amaru et al. |
| 2004/0098401 A1 | 5/2004 | Angele |
| 2004/0105424 A1 | 6/2004 | Skoczkowski et al. |
| 2004/0216030 A1 | 10/2004 | Hellman et al. |
| 2004/0216147 A1 | 10/2004 | Yanosy et al. |
| 2004/0218591 A1 | 11/2004 | Ogawa et al. |
| 2004/0225629 A1 | 11/2004 | Eder |
| 2004/0243595 A1* | 12/2004 | Cui et al. ...................... 707/100 |
| 2004/0267567 A1 | 12/2004 | Barrera et al. |
| 2005/0044197 A1 | 2/2005 | Lai |
| 2005/0086360 A1 | 4/2005 | Mamou et al. |
| 2005/0198255 A1 | 9/2005 | Wainscott, Jr. et al. |
| 2006/0064468 A1 | 3/2006 | Brown et al. |
| 2006/0070082 A1 | 3/2006 | Sridhar et al. |
| 2006/0074980 A1 | 4/2006 | Sarkar |
| 2006/0106473 A1 | 5/2006 | Enright et al. |
| 2006/0161544 A1 | 7/2006 | Lee et al. |
| 2006/0168178 A1 | 7/2006 | Hwang et al. |
| 2007/0043687 A1 | 2/2007 | Bodart et al. |
| 2007/0100981 A1 | 5/2007 | Adamczyk et al. |
| 2007/0156498 A1 | 7/2007 | Zwerger et al. |
| 2007/0185759 A1 | 8/2007 | Kataria et al. |
| 2007/0236346 A1 | 10/2007 | Helal et al. |
| 2008/0009959 A1 | 1/2008 | Enright et al. |
| 2008/0028068 A1 | 1/2008 | Nochta et al. |
| 2008/0059492 A1* | 3/2008 | Tarin ............................ 707/100 |
| 2008/0059559 A1 | 3/2008 | Gathman et al. |
| 2008/0172353 A1* | 7/2008 | Lim et al. ........................ 706/47 |
| 2008/0172380 A1* | 7/2008 | Czyz et al. ...................... 707/5 |
| 2008/0209505 A1* | 8/2008 | Ghai et al. ...................... 726/1 |
| 2008/0250132 A1* | 10/2008 | Ji et al. ........................ 709/223 |

* cited by examiner

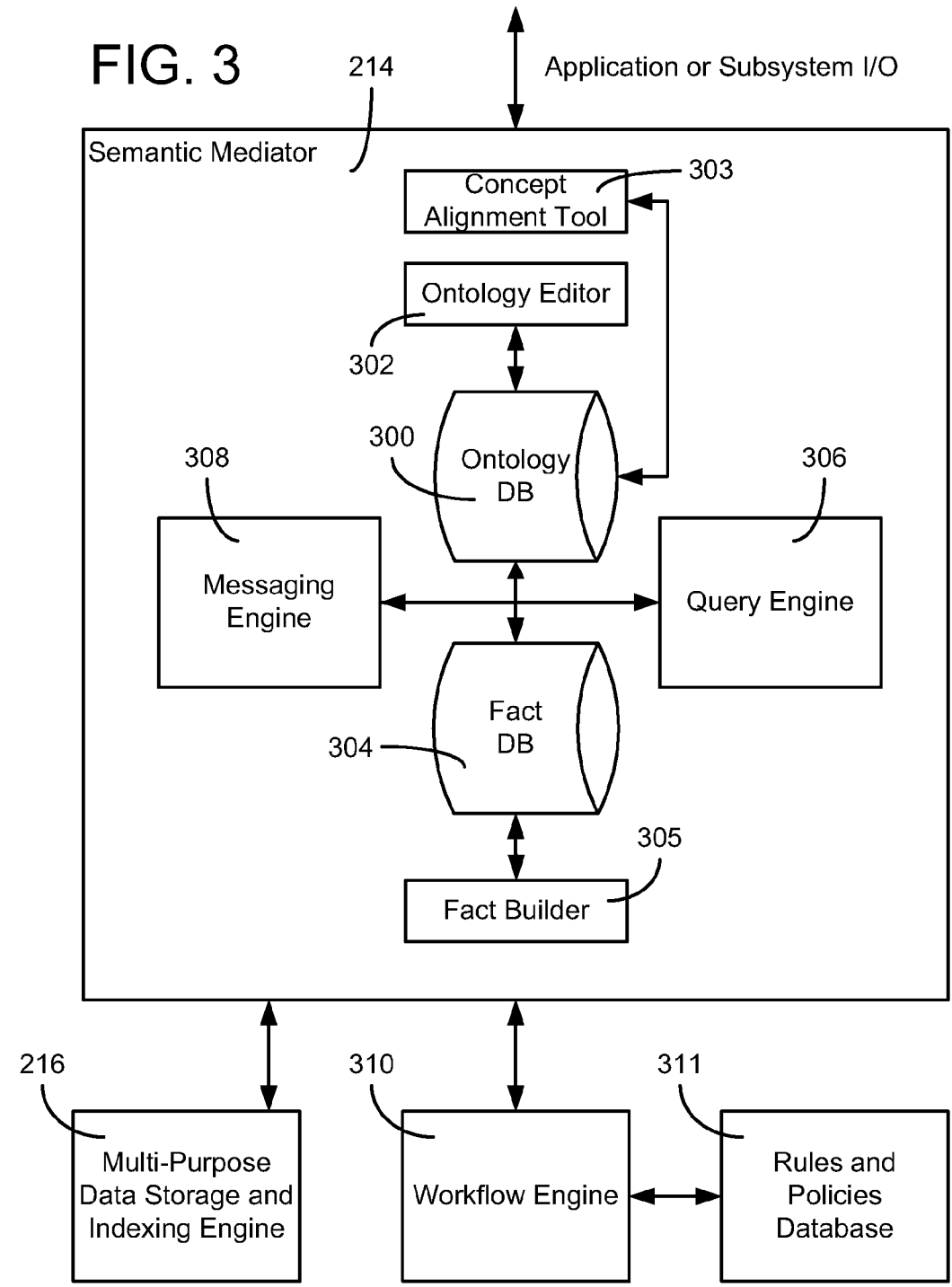

Fact DB

| Logical Type | Instance Value | Subsystem Hashed ID |
|---|---|---|
| 1→2→3→4#Device_Type<br>1→2→3→4#Present_Value<br>1→2→3→4#Units<br>1→2→3→4#Out_Of_Service<br>1→2#Name<br>1→2→3#Description<br>.... | 10k Thermistor<br>66.23<br>F<br>FALSE<br>Therm 03FL EW<br>Outside air temperature<br>... | ... Hash Values ... |

| Location ID | Location Name |
|---|---|
| 01 | Building 1 |
| 0101 | Floor 1 |
| 0102 | Floor 2 |
| 0103 | Floor 3 |
| 0101101 | Room 101 |
| ... | ... |

6-1

| Parent ID | Location Name |
|---|---|
| 01 | 0101 |
| 0101 | 0101101 |
| 0101 | 0101121 |
| 0101 | 0101122 |
| 0101 | 0101123 |
| 0102 | 0102102 |
| ... | ... |

6-2

| Location ID | Tags |
|---|---|
| 0101101 | Office |
| 0101121 | Supplies |
| 0101122 | Janitorial |
| 0101123 | Kitchenette |
| 0101102 | Conference |
| 0101102 | Office, Executive |
| ... | ... |

6-4

| Location ID | Point ID |
|---|---|
| 0101101 | ADX-1:NAE01/FC-1.011045FEC.ZN-T |
| 0101102 | ADX-1:NAE01/FC-2.011045FEC.ZN-T |
| ... | ... |

Q1.1 = SELECT "Location ID" FROM "Table 6-1" WHERE tag = "Executive"

Q1.2 = SELECT "Location ID" FROM Table 6-2 WHERE "Parent ID" in Q2.1

Q1.3 = SELECT "Point ID" FROM Table 6-3 WHERE (("Point ID" like "%ZN-T%") AND ("Location ID" in Q1.1 or Q1.2)

Q2 = SELECT * FROM events WHERE ((("Point ID" in Q1.3) AND (event.priority > 40)) AND (event.temperature > comfort.highlimit))

FIG. 6C

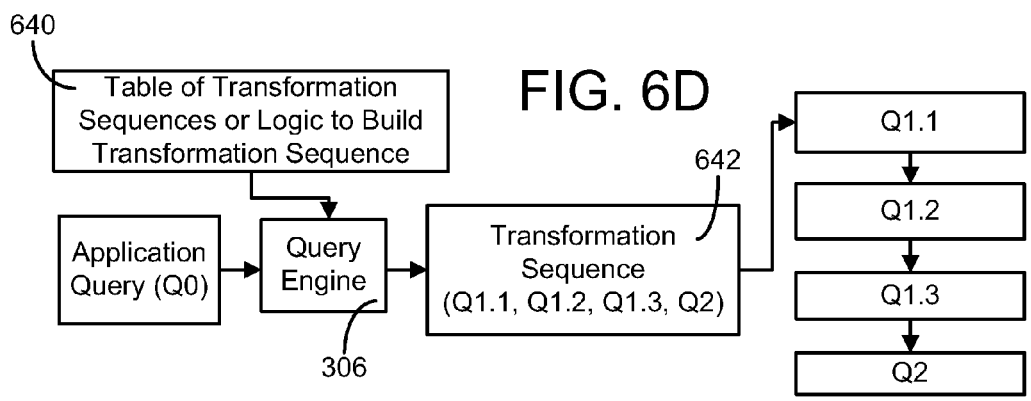

FIG. 6D ly to the field of build-
QUERY ENGINE FOR BUILDING MANAGEMENT SYSTEMS

BACKGROUND

The present invention relates general
ing management systems. The present invention more particularly relates to systems and methods for archiving and retrieving data in a building automation system.

Building automation systems are, in general, hardware and/or software systems configured to control, monitor, and manage devices in or around a building or building area. BAS subsystems or devices can include heating, ventilation, and air conditioning (HVAC) subsystems or devices, security subsystems or devices, lighting subsystems or devices, fire alerting subsystems or devices, elevator subsystems or devices, other devices that are capable of managing building functions, or any combination thereof.

As BAS systems become more complicated or as a building is upgraded to include different types or versions of BAS subsystems, system integration issues become challenging and difficult to address. For example, conventional BAS subsystems have difficulty exchanging information due to protocol differences or other incompatibilities. Queries or commands that require information from multiple subsystems are difficult to implement.

SUMMARY

One embodiment of the invention relates to a computer-implemented system for facilitating cross-subsystem queries of a plurality of building automation subsystems. The system includes a first database storing a logical model for a building automation system. The system further includes a second database storing information for the plurality of building automation subsystems. The second database relates information of the plurality of building automation subsystems based on the logical model of the first database. The system further includes a query engine configured to decompose a cross-subsystem query received from an application into a plurality of subsystem queries using the information of the second database.

The first database may be an ontology database and the second database may be a fact database. The query engine may utilize the fact database to determine ordering for the subsystem queries. In some exemplary embodiments the query engine may retrieve the subsystem queries from sets of pre-built and pre-stored subsystem queries. In yet other exemplary embodiments the query engine may build the subsystem queries by processing the cross-subsystem query. The query engine may store the plurality of subsystem queries and provides an updated message to the application originating the cross-subsystem query when results of the cross-subsystem query change. The query engine may provide the changed results through a messaging engine that uses the query result to build a message for the application. The messaging engine may append hierarchical information from the second database to the message for the application. The message for the application may include at least one string (e.g., a projected semantic type string) representing the hierarchical information associated with the message contents and based on the logical model of the first database.

Another embodiment of the invention relates to a computer-implemented method for facilitating cross-subsystem queries of a plurality of building automation subsystems. The method includes receiving a cross-subsystem query from an application. The method further includes recognizing the cross-subsystem query as requiring access to more than one of the plurality of building automation subsystems. The method yet further includes decomposing the cross-subsystem query into a plurality of subsystem queries using a database system that relates information for the plurality of building automation subsystems according to a cross-subsystem hierarchical model.

The method may further include determining ordering for the subsystem queries using the hierarchical model. retrieving the subsystem queries from sets of pre-built and pre-stored subsystem queries. The method may yet further include building the subsystem queries by processing the cross-subsystem query. The method may also include storing the plurality of subsystem queries and providing an updated message to the application originating the cross-subsystem query when results of the cross-subsystem query change. In some embodiments the method also includes providing the changed results to a messaging engine that uses the query result to build a message for the application. The method may also include appending hierarchical information from the database system to the message for the application. Appending the hierarchical information may include appending at least one string representing the hierarchical information associated with the message contents. The string may be a projected semantic type string relating to the subsystem type of the message contents. The plurality of building automation subsystems may be disparately protocolled.

Another embodiment of the invention relates to a computer-implemented system for facilitating communication between a plurality of disparate building automation subsystems and a plurality of applications. The system includes an ontology database storing a logical model for a building automation system. The system further includes a fact database storing information for a particular building automation system, wherein the ontology database relates information for the plurality of disparate building automation subsystems in a standardized fashion based on the logical model of the ontology database. The system yet further includes a messaging engine configured to receive a message from one of the disparate building automation subsystems and for one of the plurality of applications, wherein the messaging engine is configured to use the information in the fact database to transform the message into a standard format, to append hierarchical information to the transformed message, and to provide the transformed message to the one of the plurality of applications.

Another embodiment relates to a computer-implemented method for facilitating communication between a plurality of disparate building automation subsystems and a plurality of applications. The method includes storing a logical model for a building automation system in an ontology database. The method further includes storing information for a particular building automation system in a fact database. The fact database relates information for the plurality of disparate building automation subsystems in a standardized fashion based on the logical model of the ontology database. The method further includes receiving a message from one of the disparate building automation subsystems and for one of the plurality of applications at a messaging engine. The method yet further includes using the information in the fact database to transform the message into a standard format. The method also includes appending the hierarchical information to the transformed message and providing the transformed message to the one of the plurality of applications.

Alternative exemplary embodiments relate to other features and combinations of features as may be generally recited in the claims.

BRIEF DESCRIPTION OF THE FIGURES

The disclosure will become more fully understood from the following detailed description, taken in conjunction with the accompanying figures, wherein like reference numerals refer to like elements, in which:

FIG. 3 is a more detailed block diagram of the semantic mediator of FIG. 2, according to an exemplary embodiment;

FIG. 6B is an exemplary set of tables stored in a fact database, according to an exemplary embodiment;

FIG. 6C illustrates four queries that may be used to process a subsystem query using the table set of FIG. 6B, according to an exemplary embodiment;

FIG. 6D is a block diagram of a system for executing the queries of FIG. 6C, according to an exemplary embodiment;

DETAILED DESCRIPTION OF THE EXEMPLARY EMBODIMENTS

Figure 1:
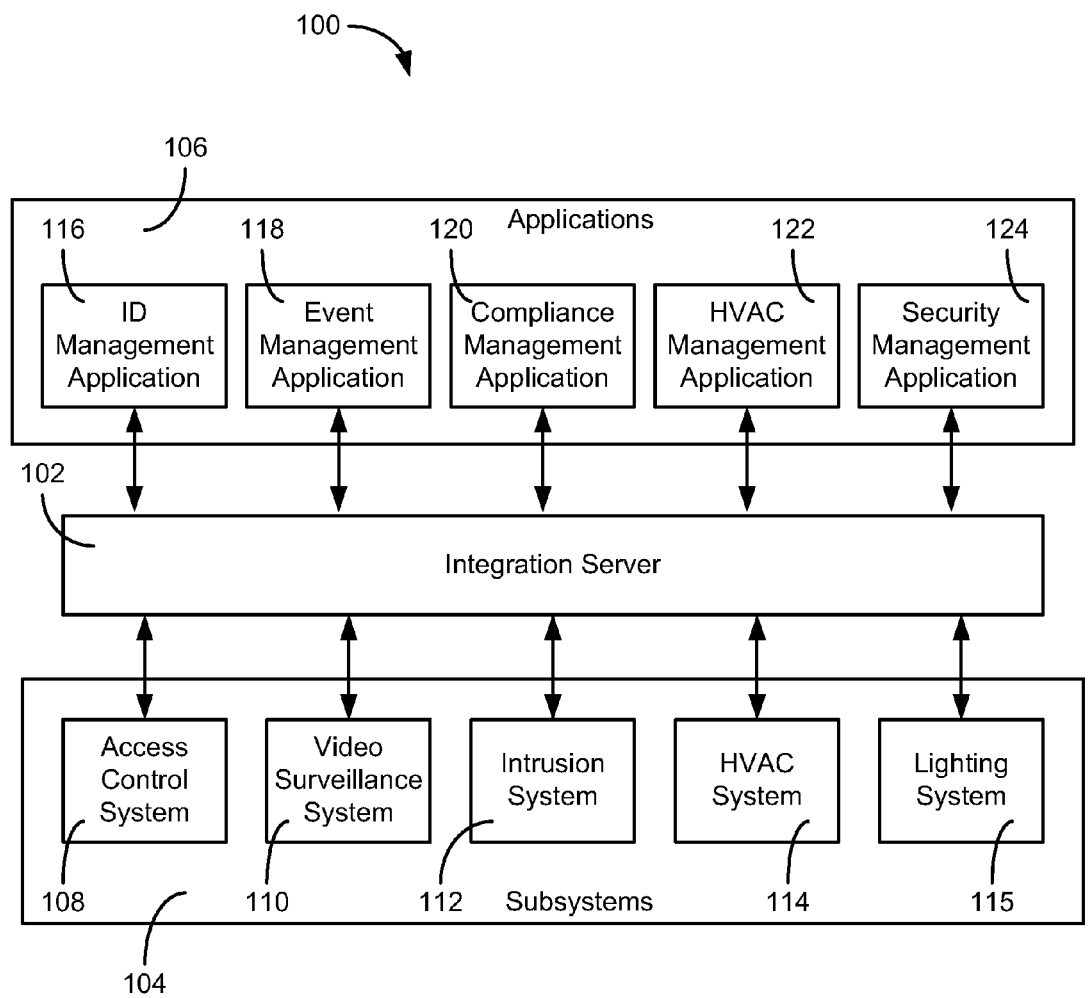
FIG. 1 is a block diagram of a BAS including an integration server, according to an exemplary embodiment.

Referring to FIG. 1, a block diagram of a BAS 100 including an integration server 102 is shown, according to an exemplary embodiment. BAS 100 is shown to include a plurality of subsystems 104. In a conventional BAS each of subsystems 104 includes its own software applications configured to control the subsystem or configured to provide user interfaces for user interaction with the subsystem. Conventional software applications typically allow for discrete operations or monitoring of the subsystem but typically do not provide for cross-subsystem control.

One embodiment of the present application relates to a computer-implemented system for facilitating communication between a plurality of building automation subsystems (e.g., disparately protocolled BAS subsystems) and a plurality of applications. The present invention advantageously allows BAS applications to utilize cross-subsystem data and cross-subsystem interaction to provide for improved control and improved user experiences.

Subsystems 104 are shown to include access control system 108, video surveillance system 110, intrusion system 112, HVAC system 114, and lighting system 115. Fewer, additional, or alternative subsystems may be included in BAS 100. Access control system 108 may include access card readers, biometric scanners, or other readers configured to obtain information about a user. A computer system of access control system 108 can check the obtained user information against access permissions or other data, record user accesses, or conduct other access control activities. Video surveillance system 110 may include any number of cameras (e.g., analog, digital, etc.) connected to video recorders, object or event recognition processors, or other processing electronics or computer systems configured to use video information. Intrusion system 112 may include a network of sensors configured to provide alarms or otherwise change states if entry to a building or area has been forced. For example, intrusion system 112 can include any number of motion detectors, infrared sensors, glass break detectors, door contact sensors, and the like. HVAC system 114 includes any number of devices, controllers, and connections configured to allow for the control of heating, ventilation, or air conditioning in a building space. For example, HVAC system 114 may include a chiller, a boiler, any number of air handling units, economizers, field controllers, master controllers, actuators, temperature sensors, or other devices for controlling the temperature within a building space. Lighting system 115 can include any number of lights, relays connected to controllers, lighting sensors, dimmers, or other devices configured to controllably adjust the amount of the light provided to a building space. It should be noted that subsystems 104 may include more than one of any given type of subsystem. For example, in an exemplary embodiment multiple HVAC subsystems may be used to provide control to the same building or to the same collection of buildings (e.g., an old building may have a first HVAC system while a new building has a second HVAC system). Further, the subsystems may communicate according to disparate protocols. For example, a first HVAC subsystem may not be configured to communicate with a second HVAC subsystem or other of the building subsystems.

BAS 100 is further shown to include applications 106. Applications 106 include identification (ID) management application 116, event management application 118, compliance management application 120, HVAC management application 122, and security management application 124. Fewer, additional, or alternative applications may be included in BAS 100. In some embodiments all of applications 106 are integrated into a single application suite or integrated within a single system. Applications 106 may be thick clients running almost entirely on remote computers (computers remote from integration server 102). Applications 106 may alternatively be thin clients where the logic for the applications is hosted on a server (e.g., integration server 102, a GUI server, a web server, or another server) and the client is used primarily for user input and output (e.g., GUI display tasks).

ID management application 116 is an application that allows the creation and use of a single user credential that propagates across or can be used across physical security, logical (information technology) security, and business systems. ID management application 116 can be used to control where users can go in a building or campus or what information the users can access (e.g., via electronic devices). ID management application 116 can track where a user has been and where a user is currently. ID management application 116 may include user interfaces for configuring physical badges, managing visitors, providing users with self-service (e.g., updating contact information for the user), or other user interfaces regarding users, access, or location.

Event management application 118 may be an application that integrates data from access control system 108, video surveillance system 110, intrusion system 112, HVAC system 114, and lighting system 115 to provide a single integrated "command center" user interface. Data from subsystems 104 can be combined on user interfaces to provide a common operating picture. The combination of pertinent data across multiple systems on a single user interface can advantageously provide for more complete situational awareness or support advanced cross-subsystem process automation features.

Compliance management application 120 may be an application that utilizes data from subsystems 104 to check for compliance relative to internal or external policies. If data is available for combination "in real time," a compliance management service such as application 120 can advantageously enable rapid event intervention or enforcement of compliance violations.

HVAC management application 122 can control HVAC system 114 and lighting system 115 using, e.g., information from access control system 108, video surveillance system 110, or intrusion system 112. Integrated control of HVAC system 114 can provide for improved occupant comfort or to conserve energy (e.g., based on occupancy information provided by access control system 108).

Security management application 124 can provide a unified interface for monitoring security in a building space using a number of different inputs from a number of different subsystems. For example, security management application 124 can receive inputs from intrusion system 112, video surveillance system 110, access control system 108, and/or HVAC system 114 (occupancy sensors of the HVAC system may be used by security algorithms of security management application 124).

Integration server 102 is configured to allow for cross-subsystem data communication, for one of the applications of applications 106 to utilize data from more than one subsystem 104, or for applications 106 to share information. More particularly, integration server 102 is intended to provide a messaging framework that can be understood by a plurality of applications regardless of the protocol or source of the subsystem information. Integration server 102 is further configured to provide a querying service that allows subsystems or applications to conduct cross-subsystem queries. Such cross-subsystem queries may allow an application (or end user operating the application) to utilize natural language queries or context rich queries. For example, a query such as the following may be entered by a user and executed by an application: "Show me high priority notifications about temperature increases outside of comfort levels in the rooms in the executive suite while the rooms in the executive suite are occupied." Such cross-system queries have traditionally been very difficult for end-users to create and execute without detailed information about the underlying database design and access to a low level query editor (e.g., a structured query language (SQL) editor).

Figure 2:
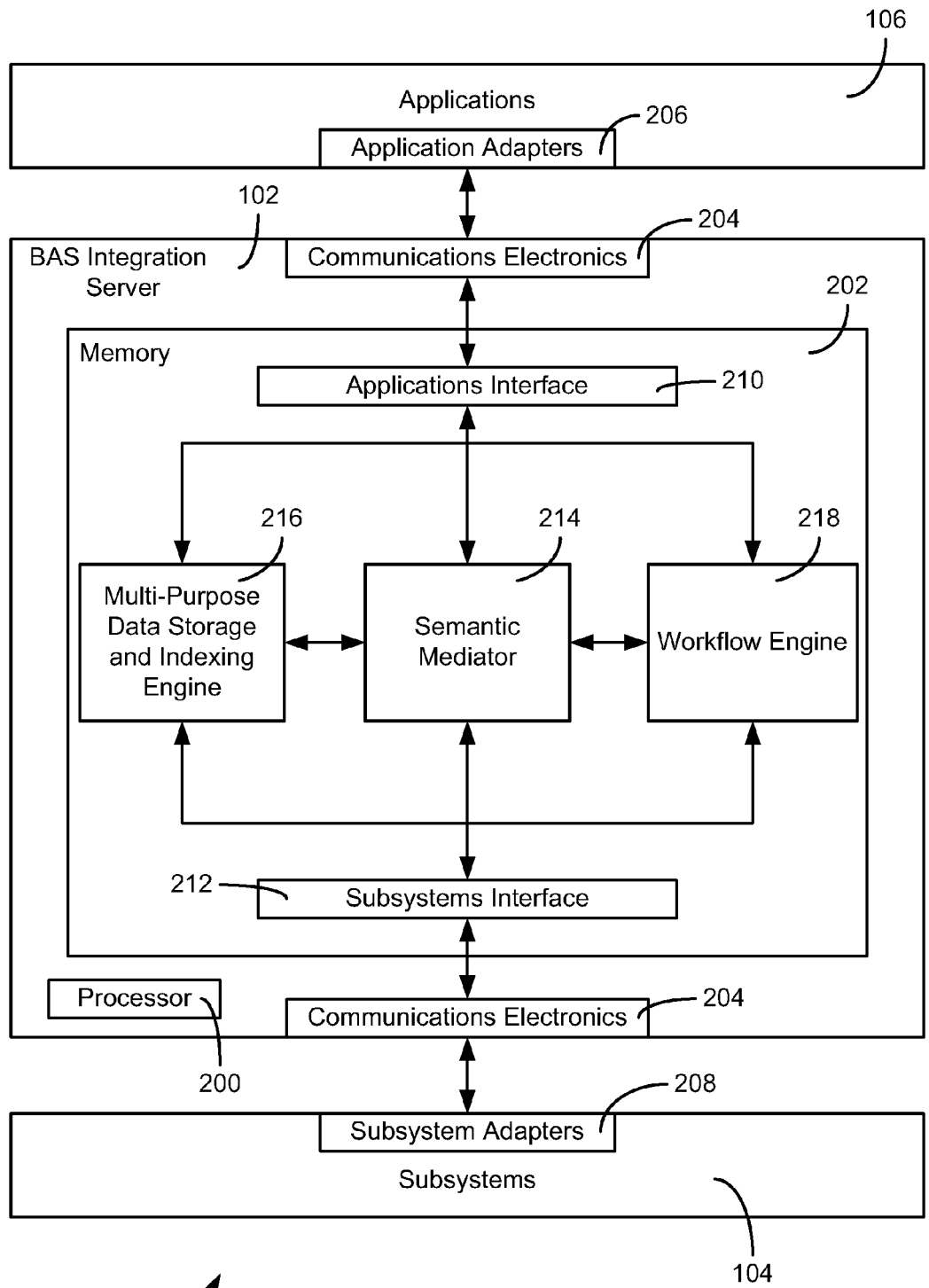
FIG. 2 is a block diagram showing a more detailed view of the integration server of FIG. 1, according to an exemplary embodiment.

Referring now to FIG. 2, another block diagram of BAS 100 is shown, according to an exemplary embodiment. In FIG. 2, BAS integration server 102 is shown in greater detail to include processor 200, memory 202, and communications electronics 204. According to an exemplary embodiment, processor 200 can be implemented as a general purpose processor, an application specific integrated circuit (ASIC), one or more field programmable gate arrays (FPGAs), a group of processing components, or other suitable electronics components. Memory 202 (e.g., memory unit, memory device, storage device, etc.) is one or more devices for storing data and/or computer code for completing and/or facilitating the various processes described in the present disclosure. Memory 202 may be or include volatile memory or non-volatile memory. Memory 202 may include database components, object code components, script components, or any other type of information structure for supporting the various activities and information structures described in the present disclosure. According to an exemplary embodiment, memory 202 is communicably connected to processor 200 via electronics circuitry and includes computer code for executing (e.g., by processor 200) one or more processes described herein. Communications electronics 204 can be or include wired or wireless interfaces (e.g., jacks, antennas, transmitters, receivers, transceivers, wire terminals, etc.) for conducting data communications with another system or network. For example, communications electronics 204 can include an Ethernet card and port for sending and receiving data via an Ethernet-based communications network. In another example, communications electronics 204 includes a WiFi transceiver for communicating via a wireless communications network. Communications electronics 204 may be configured to communicate via local area networks or wide area networks (e.g., the Internet, a building WAN, etc.). While FIG. 2 shows applications 106 and subsystems 104 communicating with BAS integration server 102 via communications electronics 204, in some embodiments applications 106 or subsystems 104 may be hosted within BAS integration server 102. For example, BAS integration server 102 or, more particularly, memory 202, can include HVAC management application 122 as well as many software components of HVAC system 114.

Referring still to FIG. 2, applications 106 are shown to include application adapters 206 and subsystems 104 are shown to include subsystem adapters 208. Further, memory 202 is shown to include applications interface 210 and subsystems interface 212. Integration server 102 is configured to receive messages transmitted from subsystems 104 and intended for reception by any other subsystem or for any of applications 106. Messages normally transmitted from subsystems 104 can be formatted according to a particular subsystem protocol (proprietary or standardized). Subsystems interface 212 may be configured to receive messages from subsystems 104 and to convert the messages from the particular subsystem protocol into an integration protocol intended for consumption and use by integration server 102. The "integration protocol" is the native protocol of BAS integration server 102. Accordingly, adapters 206, 208 or interfaces 210, 212 operate to resolve syntactic-type heterogeneities (as opposed to semantic-type heterogeneities) that may exist between a received message and the integration protocol.

Some of applications 106 or subsystems 104 may be configured to communicate via the integration protocol without protocol conversion. As shown, adapters 206, 208 for conversion may be included with applications 106 or subsystems 104 (e.g., if the application developer supports such adapters or builds such an adapter into the application). In other instances the protocol conversion may be handled by interfaces 210, 212 of BAS integration server 102. For example, if a subsystem does not include an adapter 208 of its own and transmits proprietary messages to BAS integration server 102, subsystem interface 212 can receive such messages and convert the messages into communications according to the integration protocol. An adapter or interface for conducting conversion into an integration protocol may be provided for each different application protocol or subsystem protocol to be consumed by BAS integration server 102. When an application or subsystem has an adapter and conducts its own conversion to the integration protocol, applications interface 210 or subsystems interface 212 may allow the message to pass through to further components unmodified.

Referring further to FIG. 2, BAS integration server 102 is shown to include a semantic mediator 214. Semantic mediator 214 is generally configured to resolve semantic heterogeneities between a subsystem or application and BAS integration server 102. Semantic heterogeneities may occur in resource naming, resource hierarchy properties associated with a resource, actions that may be performed by an actionable resource, and the like. Semantic mediator 214 is described in greater detail in subsequent Figures. Data or messages converted into an integration protocol are made semantically complete by semantic mediator 214. Semantically complete messages may be stored in multi-purpose data storage and indexing engine 216 or transmitted to other subsystems or applications via rules contained in workflow engine 218. For example, when occupancy information is received from a security subsystem (e.g., access control subsystem 108 shown in FIG. 1) it may be processed by semantic mediator 214 and provided to workflow engine 218 which may use a set of rules to determine that the semantically unified occupancy information is to be further provided to an HVAC subsystem, a security interface, and an HVAC application.

Figures 4A, 4B:
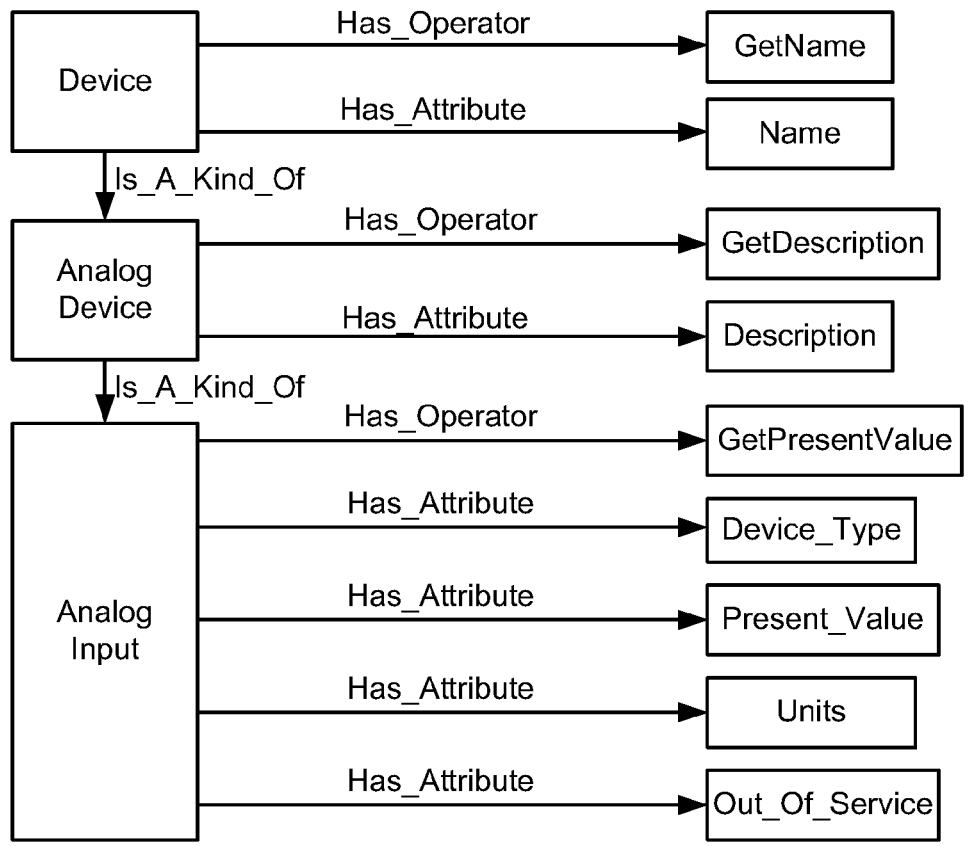
FIG. 4A is a directed graph representing a model of a theoretical BAS, according to an exemplary embodiment.
FIG. 4B is a table set that may be stored in the ontology database of FIG. 3 and representing the directed graph of FIG. 4A, according to an exemplary embodiment.
Figures 5A, 5B:
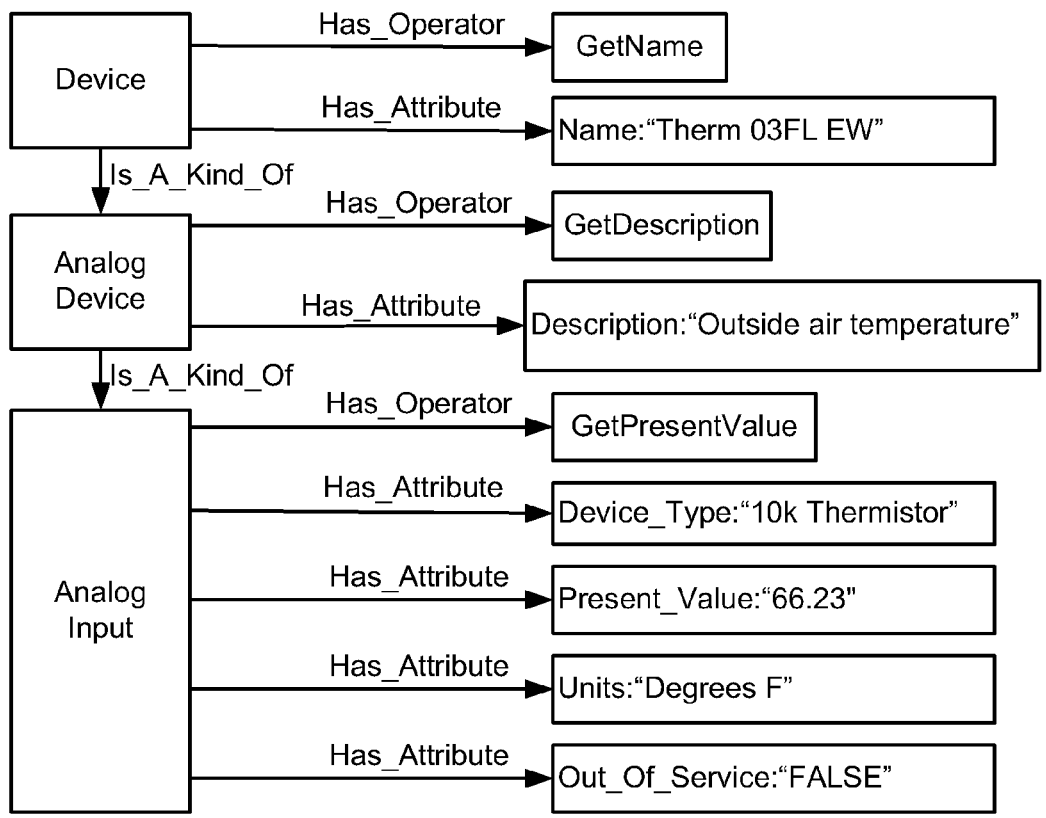
FIG. 5A illustrates a particular instance of the directed graph shown in FIG. 4A, according to an exemplary embodiment.
FIG. 5B is an example of a fact database portion having contents representing the instance of FIG. 5A, according to an exemplary embodiment.

Referring now to FIG. 3, a detailed diagram of semantic mediator 214 is shown, according to an exemplary embodiment. Semantic mediator 214 includes and utilizes ontology database 300 to conduct its conversions. Ontology database 300 stores sets of resource definitions and relations between resources. Ontology database 300 may initially be populated and maintained via ontology editor 302. Ontology editor 302 may generate graphical user interfaces (GUIs) for display on a connected (e.g., networked) electronic display device or remote terminal. Ontology editor 302 may be used to model a theoretical BAS via a relational database. The model of a theoretical BAS may be represented (e.g., via a GUI presented to a system engineer) using a directed graph such as shown in FIG. 4A. Ontology editor 302, another computer process, or a manual process may be used to convert the directed graph of FIG. 4A into a hierarchical model of a theoretical building automation system by creating the table set of FIG. 4B. Reading the table "Is_A_Kind_Of", one can see, for example, that Analog Input (concept "4") is a kind of Analog Device (concept "3"), which is a kind of Device (concept "2"). Further, Analog Input (concept "4") has attributes 3, 4, 5, and 6 which correspond to Device_Type, Present_Value, Out_Of_Service, and Units attributes. By fully populating ontology database 300 with a hierarchical model of a building automation system, semantic mediator 214 provides a hierarchical model or reference for applying to or for use by a particular BAS. However, ontology database 300 does not store particular instances of BAS configuration data or data relating to a particular set of BAS subsystems. Rather, ontology database 300 provides the logical model (e.g., theoretical model, hierarchical model, reference model, etc.) for a particular BAS and its configuration data. Particular configuration data, as well as actual recent state information and values, are stored in fact database 304. Aspects of fact database 304 are based on the model of ontology database 300. For example, the hierarchical model of ontology database 300 may be used to fully populate information of fact database 304. FIG. 5A illustrates a particular application of the ontological model (i.e., hierarchical model) shown in FIG. 4A to a device named "Therm 03FL EW." Each attribute is populated with a value. Using the directed graph shown in FIG. 5A, a person can view and appreciate the context relating to any given attribute (e.g., Present_Value:"66.23") by inspecting surrounding attributes and traversing through the graph to learn more about the type of device to which the attribute relates.

Fact Database

To enable fast information retrieval and to reduce the number of tables that must be accessed during a query operation, fact database 304 may be configured to store information in at least one table having a flat format. Such a table may include one row per attribute (e.g., one row per BAS attribute, one row per BAS object) in a complete BAS (including all of the BAS subsystems). In an exemplary embodiment, each row or record is stored with a projected semantic type string comprising multiple levels of type information and based on the hierarchical model stored in the ontology database 300. By way of example, FIG. 5B is a simplified example of a fact database 304 portion having contents representing the device of FIG. 5A and using the ontological model stored in the tables of FIG. 4B. A query for the value for Present_Value of Device "Therm 03FL EW" should provide the row having a logical type "1→2→3→4#Present_Value" as well as an instance value of "66.23." Therefore, in addition to the actual value or instance value (i.e., "66.23"), the return string includes a projection of the semantic type information relating to the actual value or instance value. In the example of FIG. 5B, the projected semantic type string includes the name of the attribute (the string after "#") as well as the attribute's parent device (e.g., the "4" prior to the "#") and a projection of further hierarchical information. The projected semantic type string can be parsed (e.g., by the semantic mediator, by another application, etc.) to obtain semantic information such as an attribute's full type hierarchy. Multiple records in the fact database can be used to construct, re-construct, or use the information of the directed graph of FIG. 5B. Advantageously, normal accesses to the Fact DB may not require multiple table accesses, queries that join multiple tables, or other more complicated queries to return and use the fully projected semantic type information. For example, using the projected semantic type information returned in the logical type field, a receiving node (e.g., having ontology information, configured to understand the delimiters and string contents of the projection, etc.) can determine that the attribute "Present_Value" is an attribute of "Analog Input," that "Analog Input" is a kind of "Analog Device," and that "Analog Device" is a kind of "Device." Each relationship in the projected semantic type string may be delimited with a different character or set of characters. In the example of FIG. 5B, "→" represents the Is_A_Kind_Of relationship and "#" represents the Has_Attribute relationship. In an exemplary embodiment the projected semantic type string is fully projected (e.g., each semantic type string begins at a root node and communicates all intermediate relationship information between the root node and the particular object or attribute of the record). In other exemplary embodiments the projected semantic type string is not fully projected and starts with a logical head node (e.g., a field controller associated with the object). In some embodiments, a fact database may use multiple tables to represent multiple different types of relationship hierarchies. In other embodiments the fact database may include fewer tables (e.g., a single table).

The projected semantic type information of fact database 304 may also contribute to the ability of BAS data to be indexed and quickly retrieved via the index. Devices in a BAS subsystem may most frequently transmit messages by a subsystem specific data type or unique name string. These unique subsystem specific type strings normally transmitted by the BAS subsystems to the integration server may be the keys used to create indexed hash values for the Fact DB. Therefore, when a message is received from a subsystem its type may be used to quickly access the corresponding record in the fact database and the projected semantic type information may be extracted from the record without joining another table. This projected semantic type string may be appended to the message from the BAS subsystem and quickly forwarded to an application or another process for consumption. This process may facilitate fast retransmission of messages via the integration server generally and the semantic mediator more particularly. Once retransmitted the messages include hierarchical information (e.g. the projected semantic type string) so that the consuming processes can process the message in light of the rich context provided by the projected semantic type information.

Figure 5C:
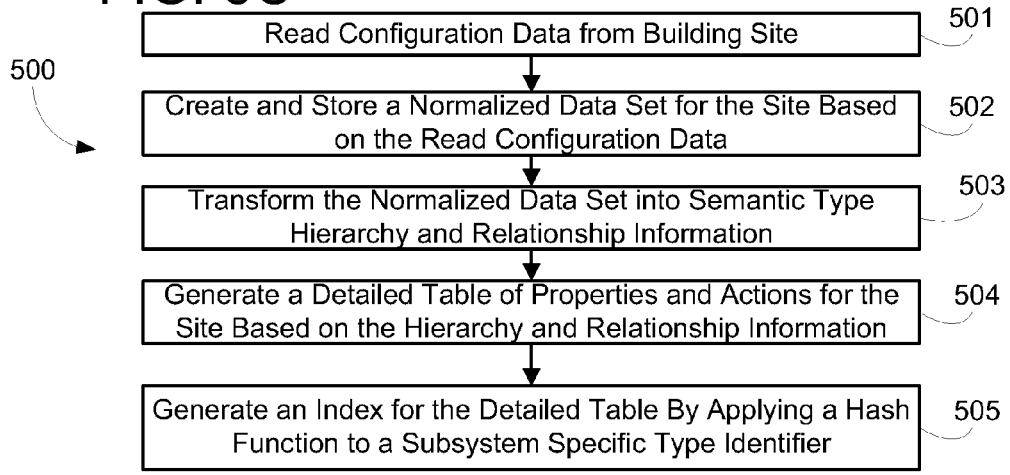
FIG. 5C is a flow chart of a process for creating a BAS integration framework according to an exemplary embodiment.
Figure 5D:
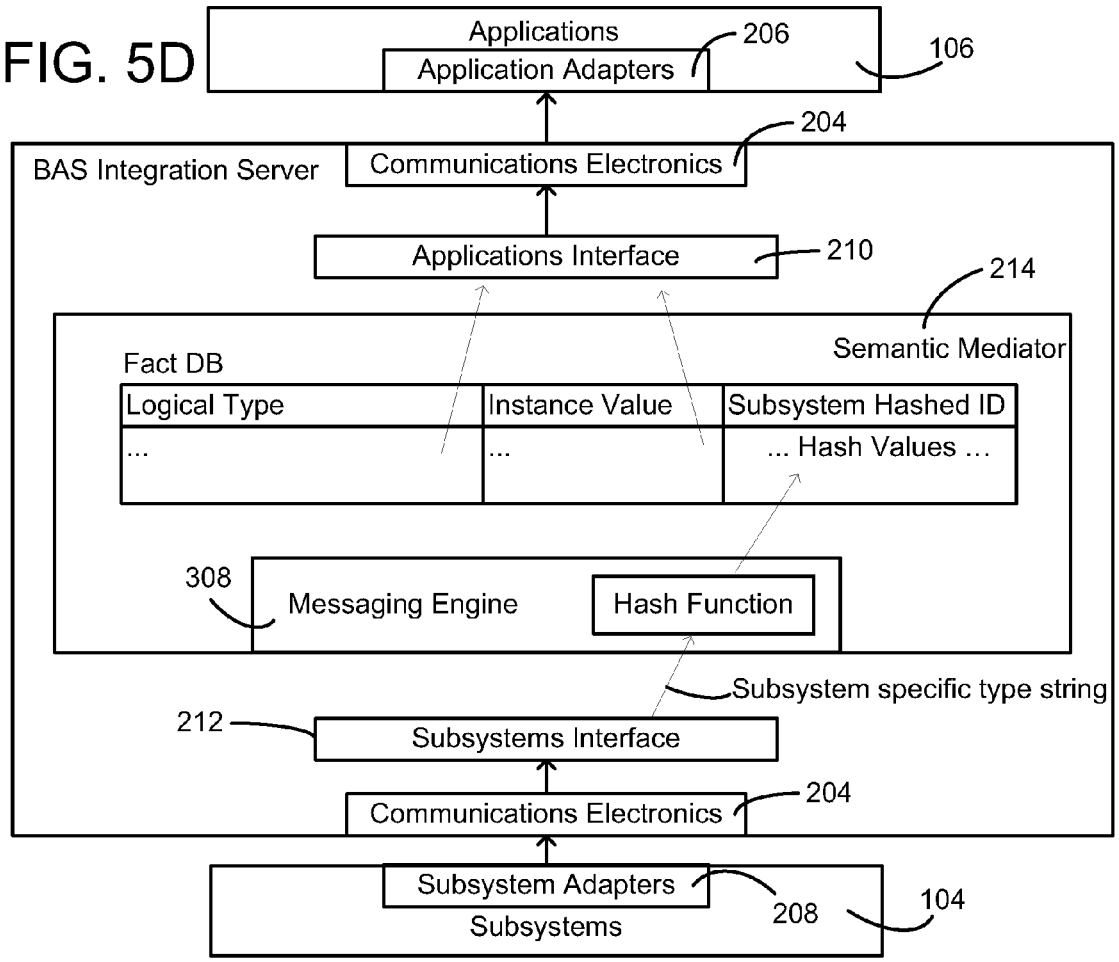
FIG. 5D is a partial block diagram of the integration server of FIG. 1, according to an exemplary embodiment.

FIG. 5D illustrates a process for providing messages from disparately protocolled building automation subsystems 104 to applications 106 that use an integration protocol. Messages transmitted through subsystem adapters 208, communications electronics 204, and subsystems interface 212 may be variously reformatted, cleaned, or parsed, but semantic mediator 214 still receives information that has not yet been fully converted from a subsystem specific protocol to a context rich message. In an exemplary embodiment the messages from subsystems interface 212 include a subsystem specific type string. In some embodiments the subsystem specific type string may be changed or added to the message by the subsystems interface 212 or subsystem adapters 208. A hash function of messaging engine 308 may resolve received subsystem specific type strings into indexed hash values existing in Fact DB. The messaging engine 308 may use the indexed hash values to quickly retrieve logical type and instance value information corresponding to the subsystem hashed index value. The messaging engine 308 may update the "instance value" field based on a changed value in the subsystem message. The messaging engine 308 may then transform the subsystem message into a standard format and append the logical type string (e.g., a fully projected semantic type string, a partially projected semantic type string, a hierarchical type string, a flat string that describes a type hierarchy, etc.) to the transformed message. The messaging engine 308 can then provide the message to the applications interface 210 which may coordinate the transmission of the message via communications electronics 204 to application adapters 206 and applications 106.

In other exemplary embodiments the Fact DB may have multiple indexes or use a hash index that has multiple inputs. For example, because particular types of devices may be well distributed around a building, one or more of the hash functions used to create index values may be based on a location-based relationship. For example, if Served_By is a relationship that is tracked by the system and generally describes an area (e.g., a floor) that is served by a device or system, fact database 304 may include a logical type entry such as "1→Floor 4A→2→3→4#Present_Value." Accordingly, "Floor 4A" may be hashed as a key (or used as one of many inputs to a hash function) to allow for faster location-based searching or querying. It should be appreciated that other indexing schemes may be utilized to search the records of fact database 304. The indexing may be completed using, e.g., multi-purpose data storage and indexing engine 216 shown in FIGS. 2 and 3.

To build fact database 304 or to add records to fact database 304 as devices are brought online, multi-purpose data storage and indexing engine 216 may be configured to utilize a type concatenation process that traverses from the relationship root (φ) in the tables shown in FIG. 4B to each child node. The concatenation process recursively adds names or values to the projected semantic type strings of fact database 304. For example, when fact database 304 is initially being populated, a process may start at the root, add the root to the string, get the first record in the "Is_A_Kind_Of" table, add "2" to the string delimited by a character that represents the "Is_A_Kind_Of" relationship, and so on.

Referring still to FIG. 3, semantic mediator 214 is shown to include a concept alignment tool 303 and a fact builder 305. Concept alignment tool 303 provides a user interface to a user for customizing the conversion from a proprietary message into a standardized integration protocol message. For example, concept alignment tool 303 allows users to create functions or scripts for recognizing a piece of data having a first protocol or format and converting the data into the integration protocol message. Fact builder 305 provides a user interface to a user for applying the ontology relationships to a particular BAS and for recording relationships that automated processes of the system have difficulty recognizing or recording. For example, some of the relationships of fact database may be concepts relating to user organization of a space. A space-related relationship of ontology database may be "serves" and another may be "located_within." The "serves" relationship may relate the services provided by a building device to a particular building space or spaces. The "located_within" relationship may relate a building device to its particular location or locations. The fact builder 305 may provide a user with a graphical user interface for associating a number of locations with the "serves" and "located_within" relationships. For example, the fact builder 305 may associate a single thermostat with multiple rooms using the "serves" relationship and with a single room using the "located_within" relationship.

The process for building the BAS integration framework (e.g., the contents of the fact database) disclosed herein may be manual (e.g., driven via user interfaces of concept alignment tool 303 or fact builder 305), automated (an automated configuration module may use inferences, patterns, and test signals to create and refine BAS integration data), or a mixture thereof. The process 500 of FIG. 5C is an exemplary process for building a BAS integration framework regardless of whether the process is manual, fully automated, or a mixture thereof. Process 500 includes reading configuration data from a building site (step 501). Step 501 can include learning as much information about the current site and the site's disparate subsystems as possible and obtaining all of the inputs and outputs of the system for relation, tagging, or classification. Step 502 includes creating and storing a normalized data set for the site based on the read configuration data. Step 502 may include, for example, creating a list of devices to be classified and related. Step 503 includes transforming the normalized data set into semantic type hierarchy and relationship information. Step 503, for example, may include building an ontology database using the data retrieved and stored in steps 501 and 502. Step 503 may also include the population of tables in the fact database or other classification of devices and inputs or outputs. Process 500 further includes generating a detailed table of properties and actions for the BAS site based on the hierarchy and relationship information (step 504). The detailed table of properties may be, for example, the fact database shown in FIG. 5B. An index for the detailed table may be created (step 505) using a hashing function based on, for example, corresponding subsystem-specific information (e.g., a subsystem specific type string), the hierarchy information, or the relationship information. For example, a subsystem-specific string that will be transmitted to the integration server from the subsystem may be applied to a hash function and the results may be used in the indexing of the Fact DB (see, e.g., FIG. 5B, FIG. 5D).

Query Processing and Integrated Event Monitoring

As mentioned above, the architecture of BAS integration server 102 generally and semantic mediator 214 more particularly can be used to provide for rich querying services. One example of such a service is a subscription service wherein an application (GUI application) subscribes to receive events within the subsystems. As subscribed events occur in the subsystems, messages are generated and sent to the client. For example, a GUI may allow a user to create a subscription query using natural language such as:

Q0="Receive priority notifications about temperature increases outside comfort levels in the executive offices area while any of the executives are there."

Figure 6A:
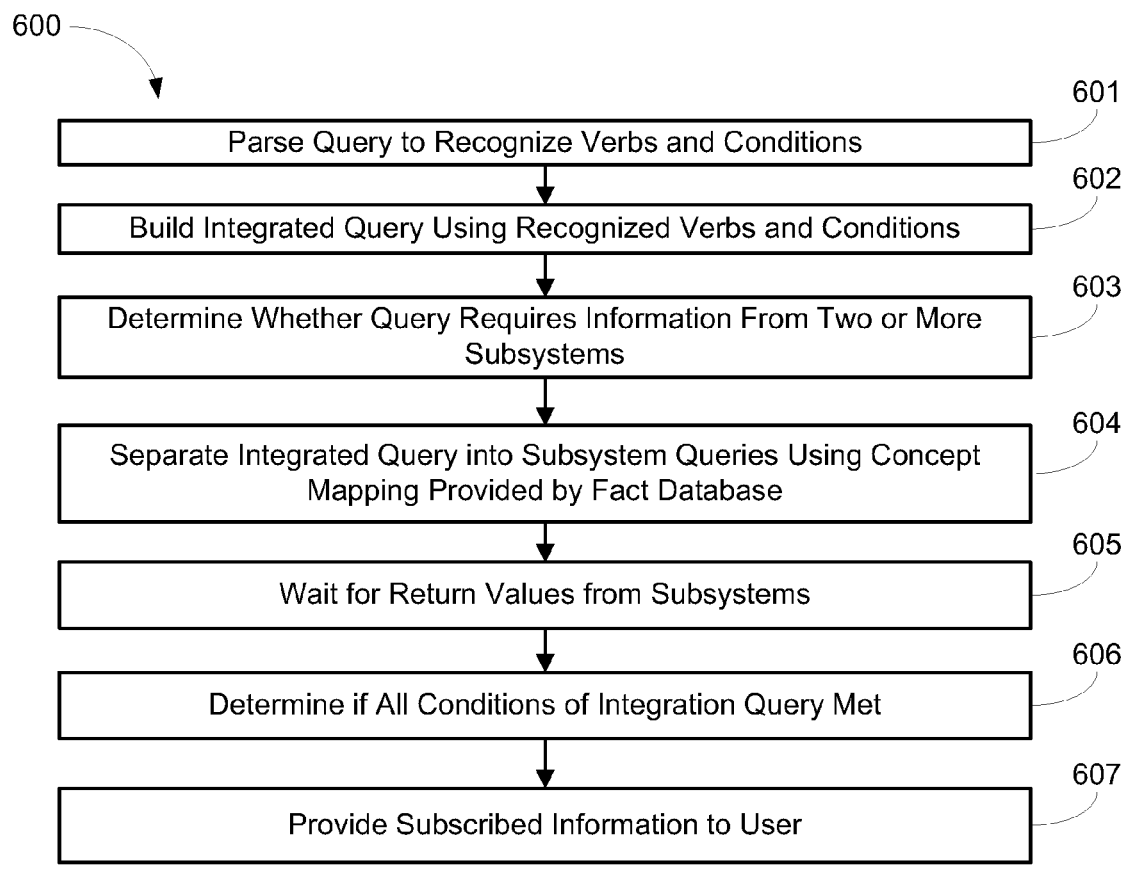
FIG. 6A is a flow chart of a process for receiving and servicing a query requiring information from multiple systems, according to an exemplary embodiment.

As indicated above, such a query may be resolved by accessing two subsystems (e.g., an HVAC system and an access control system). The natural language aspects of query Q0 are transformed into semantics usable by subsystems (e.g., using the semantic mediator, using pre-stored rules and policies). One exemplary process 600 for receiving and servicing a subscription based on a query such as Q0 is shown in FIG. 6A. Query Q0 may first be parsed to recognize or separate verbs and conditions (step 601). An integrated query may then be built using the recognized verbs and conditions (step 602). The integrated query may be built by, for example, changing the recognized verbs and conditions to standardized terms and conditions. The system may then determine whether the integrated query requires information from two or more subsystems (step 603). If the query requires two or more subsystems, process 600 may then decompose (i.e., separate) the integrated query into subsystem queries using concept mapping provided by the fact database (step 604). Examples of such concept mapping are provided below in FIG. 6B. Once such subsystem queries are created and concept mapped, the system may wait for return values meeting the query requirements from the subsystems (step 605). Even when a subsystem query yields a positive result (returns more than an empty set for a given period of time), the system may then determine if all of the conditions of the integration query are met (step 606). For example, the system may determine whether both subsystem queries yielded results corresponding to a similar period of time (if the query is temporal) or are otherwise appropriately joined. If all of the conditions of the integration query are met, the return information is provided to the user or subscription (step 607).

FIG. 6B illustrates the concept mapping tables that may be stored in a fact database. Table 6-1 associates location names with location IDs. Table 6-2 contains a hierarchy of locations where the table associates a parent location ID with a location ID. Each location ID may be a constructed by concatenating the parent ID with the particular location ID. Table 6-3 maps locations (e.g., rooms) to points from the control system. In Table 6-4, tags are applied to the location entities.

FIG. 6C illustrates four queries that may be used to process the HVAC subsystem query. Because the HVAC system may not store concepts such as location information, room type information and the like (or in systems wherein multiple HVAC systems are used), the system refers to multiple concepts in the ontology database or the fact database to seek the correct information from the subscription. Particularly, the queries shown in FIG. 6C find points to monitor in Q2 by querying Table 6-1, 6-2, and 6-3 in an iterative fashion. Query Q1.1 finds all locations where the tag is equal to "Executive." This query will return rooms and floors. If a particular room has not been tagged with "Executive" but the entire floor in which a room exists has been tagged with "Executive" then Query Q1.2 will catch this inheritance. Query Q1.3 finds all HVAC points where the point name includes "ZN-T" (which may indicate a temperature sensor). Q2 queries an events table (which may be a table of recent events) where the point is identified by Q1.3, the event priority is greater than 40, and the temperature indicated by the event is greater than a comfort limit. The system may convert "high priority" from Q0 into the numeral 40 via a lookup table in the ontology database or otherwise.

The creation of queries Q1.1 through Q2 or portions thereof can be completed manually and the queries or query templates may be stored in memory. Referring now to FIG. 6D, when a user or application requests that a complete query Q0 be executed, query engine 306 may use a table 640 of transformation sequences or logic to build a transformation sequence 642 (i.e., a sequence of queries expected to be responsive to Q0). For example, Q0 may be a pre-established string that a user or application may select for execution. Query engine 306 can lookup transformation sequence 642 and drive the sequential execution of Q1.1, Q1.2, Q1.3, and Q2. The table of transformation sequences 640 may include links to queries Q1.1, Q1.2, Q1.3, and Q2 along with an indication of the order or nesting for the queries. One or more of the stored queries (e.g., Q1.1) can include variables for user population. For example, the "Executive" may be replaced with a variable that describes a tag or set of tags to be searched. Accordingly, any query that includes a spatial requirement (e.g., "executive area", "classroom", etc.) can use or reuse the Q1.1 and/or Q1.2 structure.

Figure 6E:
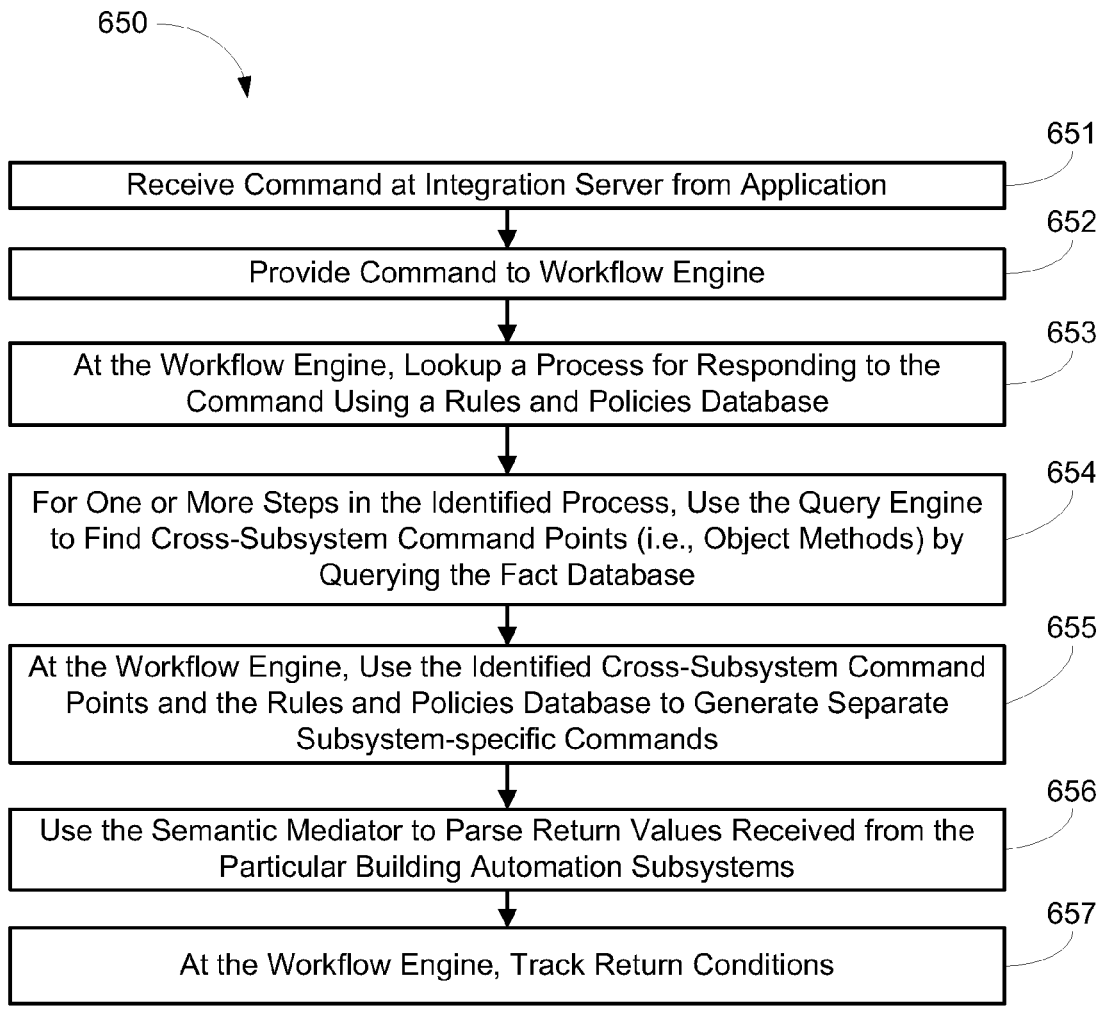
FIG. 6E is a flow chart of a process for implementing a cross-subsystem command, according to an exemplary embodiment.

Referring now to FIG. 6E, a process 650 for implementing a cross-subsystem command is shown, according to an exemplary embodiment. Process 650 is shown to include receiving a command at an integration server (e.g., integration server 102) from an application (e.g., one of applications 106) (step 651). The command may be, for example, a user interface driven command to "lower temperature in all occupied offices by five degrees." The integration server may then provide the command to a workflow engine (e.g., workflow engine 310 shown in FIG. 3) (step 652). The workflow engine may then lookup a process for responding to the command using a rules and policies database (e.g., rules and policies database 311) (step 653). The rules and policies database may include a process such as: a) find all occupied building spaces using network connection information or occupancy sensor information; b) find all temperature subsystem setpoints associated with the identified occupied building spaces; c) lower setpoint temperatures by X percent. The workflow engine can then step through the process by using the query engine (step 654). Step 654 can include finding cross-subsystem command points (e.g., a setpoint attribute that may be changed for a first HVAC subsystem, an object method for changing temperature in a second HVAC subsystem, etc.). The query engine can use the fact database or the ontology database to conduct such queries. Process 650 further includes, at the workflow engine, using the identified cross-subsystem command points and the rules and policies database to generate separate subsystem-specific commands (step 655). For example, the rules and policies database may store conversions from a percentage scale to scales particular to the subsystems that will be commanded. A five percent reduction, therefore, may be commanded in a first HVAC subsystem by using a number of TempPercReduction(5) commands and in a second HVAC subsystem by converting 5% to 1.5 steps on a 30 point scale. Once the separate commands are provided to the subsystems, the semantic mediator is used to receive and parse return values received from the particular building automation subsystems (step 656). The semantic mediator provides the return values to the workflow engine, which may track the return conditions (step 657). By tracking the return conditions from a plurality of subsystems using the semantic mediator, the system can understand when the process is complete, providing feedback to the user at a graphical user interface of the command-originating application.

Additional Features of the Messaging Engine

Figure 7A:
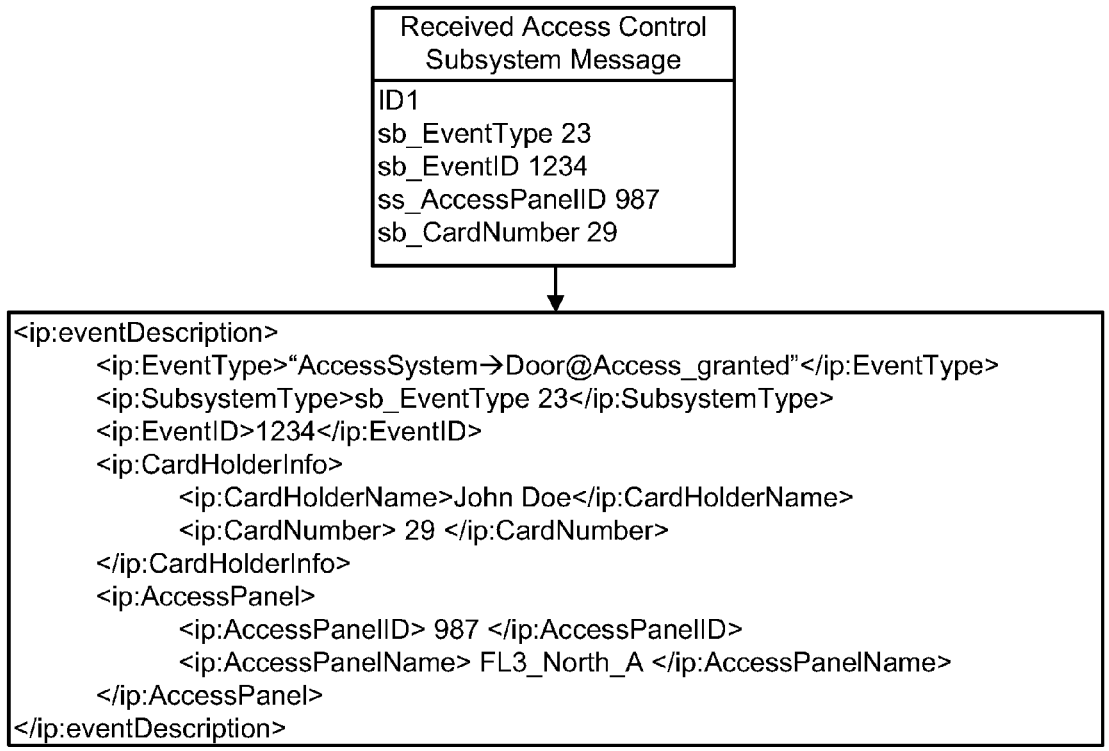
FIG. 7A is an example of a messaging transformation conducted by the messaging engine of FIG. 3, according to an exemplary embodiment.

Referring back to FIG. 3, when messages are received by semantic mediator 214, they are processed by messaging engine 308. The messages may be received in response to user initiated queries or subscriptions as described above. When a message is received, workflow engine 310 may be configured to determine whether the message is expected by a subscription or query. For example, workflow engine 310 may be configured to route information regarding occupancy in a space to multiple different applications, processes or queries waiting for such an update. Even if workflow engine 310 determines that no subscriptions or queries are waiting for information in a received message, messaging engine 308 may transform the message and provide the transformed message to multi-purpose data storage and indexing engine 216 for archival. Regardless of the recipient of the message, messaging engine 308 may add context information (e.g., a projected semantic type string) into an incoming message as well as standardize items such as events, date/time, and identifiers. An example of a messaging transformation conducted by messaging engine 308 is shown in FIG. 7A. The variables and the values of the received access control subsystem message are not well described, resolved, or have context. The lower box illustrates a message fully mediated by semantic mediator 214 and messaging engine 308.

Figure 7B:
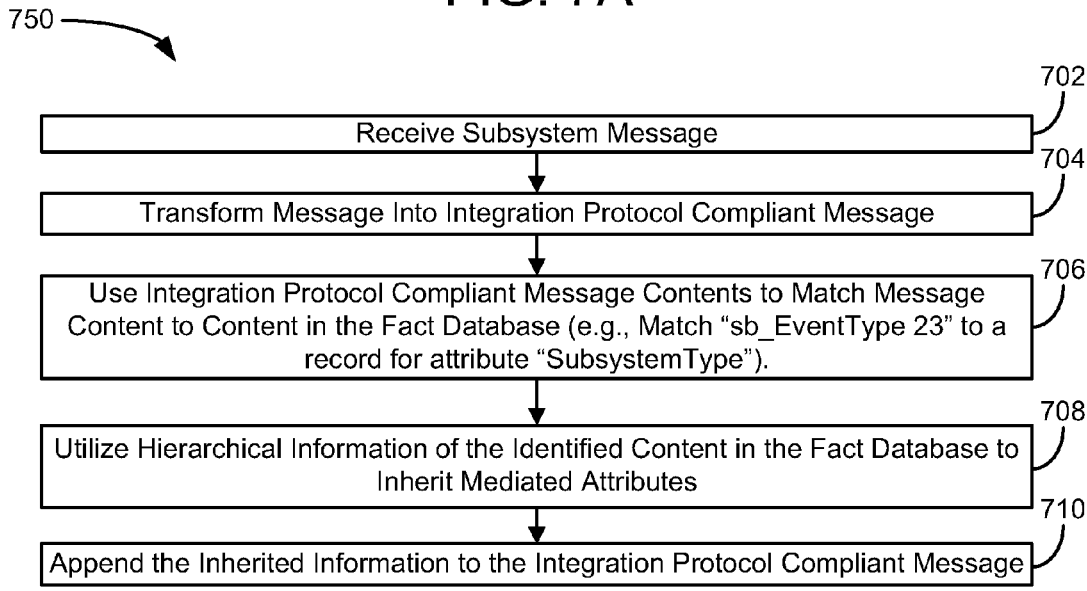
FIG. 7B is a flow chart of a process for achieving the transformation shown in FIG. 7A, according to an exemplary embodiment.

The process 750 utilized by messaging engine 308 to achieve the transformation shown in FIG. 7A is illustrated in FIG. 7B. Process 750 is shown to include receiving the access subsystem message (step 702) and transforming the message into an integration protocol compliant message (step 704). This basic transformation can be accomplished by, e.g., converting the format of the received access control subsystem message to a format compliant with the integration protocol. In the example shown in FIG. 7A, the integration protocol is an XML-based protocol. In other embodiments other data messaging protocols may be used. Process 750 further includes matching the resultant integration protocol compliant message contents to content in the fact database (step 706). For example, "sb_EventType 23" may correspond with "AccessSystem→Door@Access_granted" in the fact database, the ontology database, or another lookup table. In one example the subsystem specific type "sb_EventType 23" is applied to a hash function to lookup an index location in the fact database. Hierarchical information (e.g., a projected semantic type string) of the identified content in the fact database can then be utilized to inherit mediated attributes (step 708). For example, the system may use the event type of "AccessSystem→Door@Access_granted" to retrieve more information about the access system door (e.g., who caused the event, and information about the particular access panel associated with the door). This information can be appended to the integration protocol compliant message (e.g., in addition to the projected semantic type string) to populate the integration compliant message (step 710). For example, CardHolderinfo and AccessPanel information may be retrieved from the fact database using, e.g., the event ID and the event type.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A computer-implemented system for facilitating cross-subsystem queries of a plurality of building automation subsystems, comprising:
a first database storing an ontological model for a building automation system (BAS), wherein the ontological model represents hierarchical relationships between BAS object types without storing data values for particular instances of BAS objects;

a second database storing information for the plurality of building automation subsystems, wherein the second database comprises at least one record for each of a plurality of BAS objects, wherein the second database stores each record with a projected semantic type string comprising multiple levels of hierarchical type information for each BAS object and based on the ontological model of the first database; and a query engine configured to decompose a cross-subsystem query received from an application into a plurality of subsystem queries using the information of the second database, wherein the query engine stores the plurality of subsystem queries and combines a plurality of responses to the plurality of subsystem queries into a result of the cross-subsystem query, wherein the query engine causes an updated message to be provided to the application originating the cross-subsystem query when the result of the cross-subsystem query changes, wherein the updated message provided to the application originating the cross-subsystem query includes the changed result of the cross-subsystem query and a projected semantic type string associated with the changed result.

2. The computer-implemented system of claim 1, wherein the first database is an ontology database and the second database is a fact database.

3. The computer-implemented system of claim 2, wherein the query engine utilizes the fact database to determine ordering for the subsystem queries.

4. The computer-implemented system of claim 1, wherein the query engine retrieves the subsystem queries from sets of pre-built and pre-stored subsystem queries.

5. The computer-implemented system of claim 1, wherein the query engine builds the subsystem queries by processing the cross-subsystem query.

6. The computer-implemented system of claim 1, wherein the query engine provides the changed results through a messaging engine what uses the changed result to build the updated message for the application, wherein the messaging engine appends the projected semantic type string to the message for the application.

7. The computer-implemented system of claim 1, wherein the plurality of disparate building systems comprise a first heating, cooling or air-conditioning (HVAC) system, a second HVAC system, an access control system, and a security system.

8. A computer-implemented method for facilitating cross-subsystem queries of a plurality of building automation subsystems, comprising:

receiving a cross-subsystem query from an application;

recognizing the cross-subsystem query as requiring access to more than one of the plurality of building automation subsystems; and decomposing the cross-subsystem query into a plurality of subsystem queries using a database system that relates information for the plurality of building automation subsystems according to a cross-subsystem hierarchical model, wherein the database system comprises at least one record for each of a plurality of building automation system objects and stores each record with a projected semantic type string comprising multiple levels of hierarchical type information for each building automation system object;

storing the plurality of subsystem queries;

combining a plurality of responses to the plurality of subsystem queries into a result of the cross-subsystem query; and causing an updated message to be provided to the application originating the cross-subsystem query when the result of the cross-subsystem query changes, wherein the updated message provided to the application originating the cross-subsystem query includes the changed result of the cross-subsystem query and a projected semantic type string associated with the changed result.

9. The computer-implemented method of claim 8, further comprising:

determining ordering for the subsystem queries using the hierarchical model.

10. The computer-implemented method of claim 8, further comprising:

retrieving the subsystem queries from sets of pre-built and pre-stored subsystem queries.

11. The computer-implemented method of claim 8, further comprising:

building the subsystem queries by processing the cross-subsystem query.

12. The computer-implemented method of claim 8, further comprising:

providing the changed results to a messaging engine that uses the query result to build a message for the application; and appending the projected semantic type string to the message for the application.

13. The computer-implemented method of claim 8, wherein the plurality of building automation subsystems comprise a first heating, cooling or air-conditioning (HVAC) system and a second HVAC system;

wherein the plurality of building automation subsystems comprise an access control system and a security system.

14. The computer-implemented method of claim 8, wherein the plurality of building automation subsystems are disparately protocolled.

* * * * *